United States Patent [19]

Smith

[11] 4,283,032
[45] Aug. 11, 1981

[54] AUTOMOTIVE ENGINE LUB-OIL DRAINAGE AND DISPOSAL STRUCTURE

[75] Inventor: Kenneth R. Smith, Newhall, Calif.

[73] Assignee: Kross, Inc., San Fernando, Calif.

[21] Appl. No.: 799,474

[22] Filed: May 23, 1977

Related U.S. Application Data

[63] Continuation of Ser. No. 665,944, Mar. 11, 1976, abandoned.

[51] Int. Cl.³ .............................................. B65B 67/12
[52] U.S. Cl. ...................................... 248/97; 206/223; 248/101; 248/153
[58] Field of Search .................. 206/223, 216; 248/97, 248/101, 95, 153, 302; 211/106, 181

[56] References Cited

U.S. PATENT DOCUMENTS

| | | | |
|---|---|---|---|
| 2,235,986 | 3/1941 | Ellingson | 248/153 |
| 3,610,560 | 10/1971 | Dillabough | 248/97 |
| 3,703,956 | 11/1972 | Oswalt | 206/223 |
| 3,796,402 | 3/1974 | Trotta | 248/97 |
| 3,866,872 | 2/1975 | Burgess | 248/101 |

FOREIGN PATENT DOCUMENTS

| | | | |
|---|---|---|---|
| 1464798 | 1/1967 | France | 248/99 |
| 400007 | 4/1966 | Switzerland | 248/97 |

*Primary Examiner*—William T. Dixson, Jr.
*Attorney, Agent, or Firm*—Wegner, Stellman, McCord, Wood & Dalton

[57] ABSTRACT

A kit containing sufficient pieces and parts for use by a do-it-yourself automobile engine lubricating oil drainage and disposable operation; the kit containing a wire stand, flat in the kit package, but easily bendable into a stand, having an elevated part for holding a flexible bag in position under an engine crankcase to receive oil drained therefrom, the bag resting mainly upon a garage floor or driveway surface rather than being supported by the stand so that the weight of the drained oil may be contained. The kit may have several oil receiving bags, one stand, clips for temporarily securing the open end of the bag to the stand and ties with which to close the bag for garbage disposal of the bag and its contained used oil.

7 Claims, 6 Drawing Figures

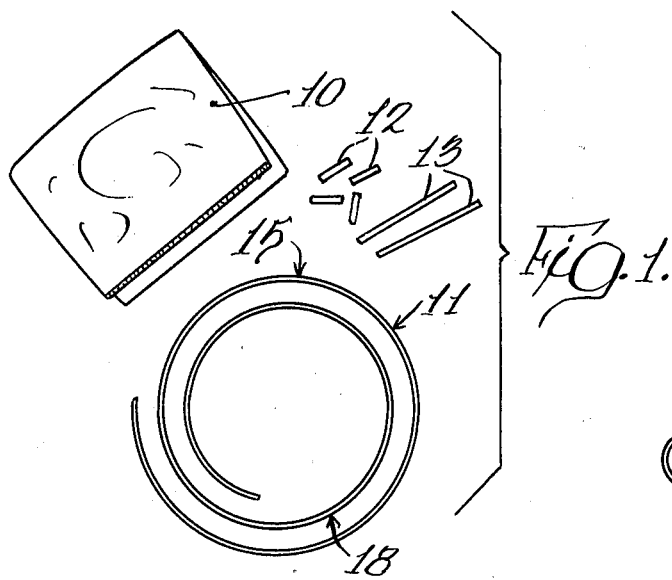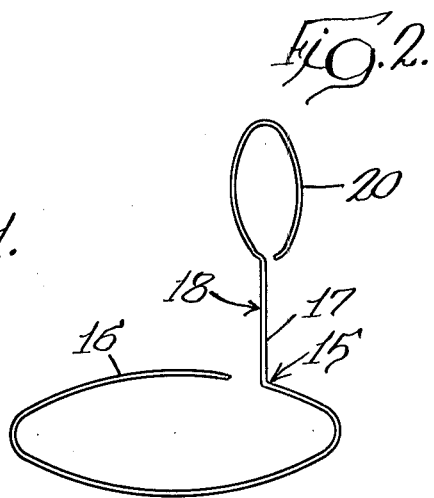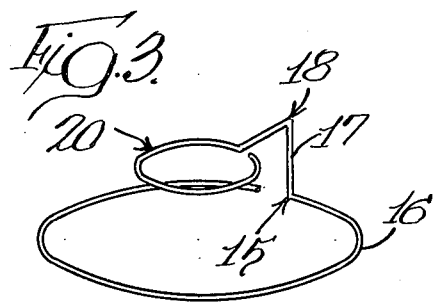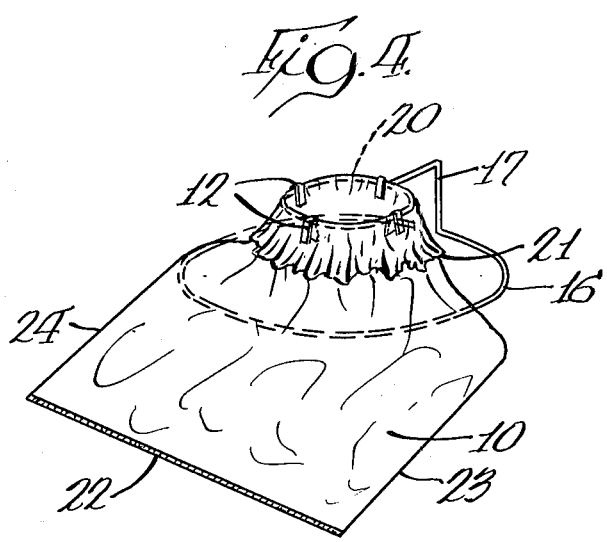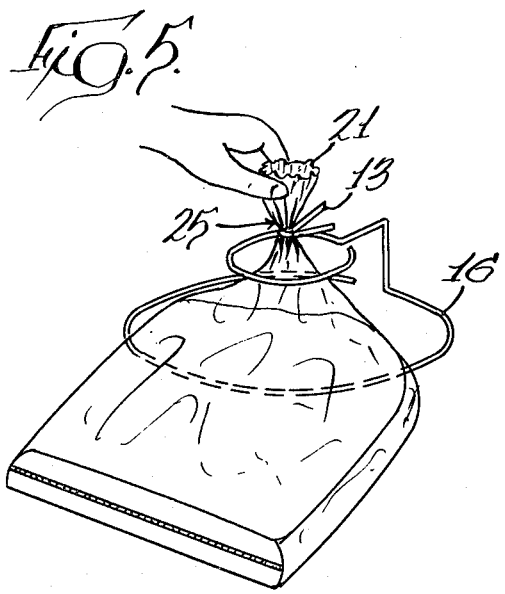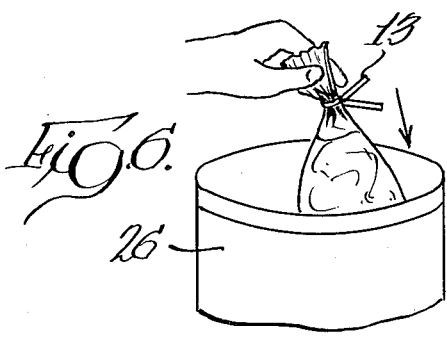

AUTOMOTIVE ENGINE LUB-OIL DRAINAGE AND DISPOSAL STRUCTURE

This is a continuation of application Ser. No. 665,944, filed Mar. 11, 1976 now abandoned.

BACKGROUND OF THE INVENTION

Many persons prefer, for varous reasons including that of economy, to service their own private automobiles. One such servicing operation has to do with the periodic changing of the engine lubricating oil. Replacement new oil is easily purchased at many automobile service stores, as well as the usual filling stations widely present throughout the country. There has not been any convenient way of disposing of the used oil from the engine. The drain opening of the engine crankcase is easily accessible under the automobile, and the drain plug can be removed with a variety of generally available wrenches. The draining of the oil into some sort of a container is necessary if a person is to do the oil changing in his own garage at his residence or in his driveway, or even upon the residential street where he lives.

Seldom does the ordinary household have any container of a size to hold the usual five quarts, or slightly less, of used oil which must be drained from an automobile engine. Even if the oil were to be drained into a relatively large pan, there still remains the matter of how to dispose of this oil, since it is practically useless for any use around a household. Old oil cans of the quart size are usually punctured and not closable so that such cans are of little use in disposing of the used oil, and there seems to be a lack of properly suitable containers available around a household for disposing of the oil.

It is important to the home owner to avoid spilling the used oil upon his driveway, in his garage, or on the street in front of his home. It is, therefore, desirable that in draining the oil from his automobile, he should spill none, but collect all of it for disposal away from the home site. There has been a real need for an economical, easily useable, and simply constructed means of disposing of oil drained from an automobile crankcase, as well as a means to make it convenient to drain such oil in the environment of the private home.

SUMMARY OF THE INVENTION

It is the principal object of this invention to provide a new and improved structure including all parts necessary for an individual to use in draining and disposing of engine lubricating oil from his private motor vehicle.

Another object is to provide such structure originally in the form of a kit which can be packaged for easy display and handling through the channels of trade, and easily useable by an individual for the oil draining purposes specified.

Another object is to provide an oil draining and disposal structure having an appropriate stand and oil containing bag so related that oil may be safely drained from an automobile engine as well as conveniently drained in a manner to avoid spillage.

Another object is to provide a structure of the nature described in which the stand and oil receiving bag are so related that the oil drained from an automotive engine can be contained in one bag and conveniently disposed of in the same bag through the usual garbage collection channels.

Another object is to provide a structure for individual automotive oil drainage and disposal, which is economical.

DESCRIPTION OF THE DRAWINGS

FIG. 1 is an exploded plan view of the component parts of the kit to be contained in a single sales wrap, such as a printed bag;

FIG. 2 is a perspective view of the stand in an interim configuration between its shape in the kit and its useable shape shown in FIG. 3;

FIG. 3 is a perspective view of the stand formed into its useable shape;

FIG. 4 is a perspective view of the stand and the oil receiving bag secured thereto in a position for operatively receiving oil draining from an automobile engine;

FIG. 5 is a view similar to FIG. 4 illustrating the closing of the bag containing the used oil; and FIG. 6 is a diagrammatic view illustrating the disposal of the bag and its contained used oil.

DESCRIPTION OF THE PREFERRED EMBODIMENT

The kit of this invention may be packaged in a relatively flat polyethylene bag B upon which instructions for the use of the kit may be printed. A bag of approximately 8"×10" is sufficient for the purposes, and such dimensions will serve as an indication of the relative size of the parts to be contained in the kit.

In FIG. 1, the kit comprises one or more relatively large polyethylene bags 10 which are quite flexible and are in the nature of garbage disposal bags. A satisfactory bag may be made of flat sheets or flat tubular stock and, when laid out flat, will be approximately 22" long and 13" or 14" wide.

Another part of the kit is a wire coil, which is to be formed by the purchaser of the kit, into a stand for holding the bag open under the drain opening in the crankcase of an automotive engine. Herein, a spiral formed wire coil 11 having slightly in excess of two turns is illustrated as appropriate. Also, in the kit, are a number of bendable flat metal strips which may be bent around the wire and over the bag material draped over the wire in order to secure the bag in position on the wire stand. The usual spring activated clothespins are a useable element in place of the wire strips 12.

The kit also contains a number of wire enclosed paper ties with which the oil containing bags may be closed and sealed against the loss of the oil in the bag, much in the nature of the ties used for securing the open ends of garbage disposal bags.

The term coil used relative to the stand is not to be limited to a spiral or circular form of wire, but should include any other geometric shape which will provide a base for holding the stand upright and an elevated open figured form for securing and holding the open end of the bag in a sufficiently large opening to receive the oil draining from an automobile crankcase. The form of the wire at its base and at its elevated wire form could be rectangular, square, oblong, triangular or any other geometric open figured shape.

In FIG. 2, the wire stand is shown in a form involving a bending of the largest circular part of the coil at a point 15, which is also indicated on FIG. 1. A bend is made so that the large coil 16 provides not entirely 360° of circle, but something less by approximately 15° or so, but nevertheless a base 16 of considerable stable extent. The bend at the point 15 is made so that a portion of the wire 17 forms an upstanding leg extending above the base 16. In the upstanding leg, a second bend is made at a point 18 so that an upper coil 20 may be folded over generally parallel to the base coil 16, but within its perimeter by vertical projection and generally over the base coil 16. Ordinarily the instructions printed on the sales container for the kit will indicate by graphics to the purchaser how to make the bends in the wire. A commercially available solid wire of approximately 0.115" diameter has been found satisfactory for the making the stand and capable of being bent by an individual either with bare hands or with the use of simple pliers or other hand tools.

Once the stand has been formed so that it may sit upon a garage floor holding the upper coil 20 above the base coil 16, solely by the upstanding leg 17, the open end 21 of one of the oil disposal bags 10 may be brought up through the upper coil 20 and trained over or draped over the upper coil so that the open end 21 defined by the edge of the bag is somewhat below the upper coil 20 as illustrated in FIG. 4. A number of sheet metal strips 12 may be manually bent over the bag and the wire to retain the bag in its threaded condition over the upper coil as illustrated. An upper coil size of approximately 4 to 5" in diameter has been found adequate for a person to position the assemblage under an automobile engine properly to catch all of the oil draining from an engine crankcase. The metal strips found adequate for the purposes described may be of soft metal, about an inch long and 3/16" wide and 0.020" thick. The clip is stiff enough to bind the bag to the wire stand yet bendable easily by finger applied pressure. Other clips and forms of fasteners may be subtituted as desired.

The bottom end 22 of the bag is closed as are the sides 23 and 24 so that the only entrance into the bag is at the open end 21. As illustrated in FIG. 4, the bag will rest primarily upon the same surface as the lower coil 16 of the stand, whether this be a garage floor, driveway or a street surface or other support. The bag will expand, as illustrated in FIG. 5, as oil flows into the bag, but this oil is supported almost entirely on the garage floor or the like.

Once all the oil is drained, a condition will exist as illustrated in FIG. 5. The clips 12 may be manually removed and the open end of the bag may be gathered and tied around its neck 25 by one of the paper-wire ties 13. Once the bag is closed, it may be handled by lifting the bag and its oil contents by the neck 25 whereupon the bag and its used oil may be discharged into the garbage collection apparatus, such as a garbage can 26 illustrated in FIG. 6.

Ordinarily, the kit is provided with a number of bags 10 for accommodating more than one oil draining procedure. The wire stand may be used repeatedly and polyethylene garbage disposal bags may be substituted for the bags obtained in the kit. It is important that the person utilizing the kit have a bag sufficiently large to rest upon the garage floor or the like so that the drained oil places no appreciable stress or strain upon the wire stand. This kit provides a convenient means for the do-it-yourselfer to service his own oil changing procedures in his private automobile.

I claim:

1. A structure for use in economical draining and disposal of used automotive engine lubricating oil comprising:
   a unitary used-oil bag stand formed of a length of manually bendable wire having a first outer portion defining a relatively large base for supporting the stand at rest upon a horizontal surface, a second portion defining an upright leg at one end of the wire portion defining the base, a third portion defining a horizontal arm extending inwardly of the upper end of the portion of the wire defining the leg, and a fourth, annular portion defining a throat element having a preselected small diameter of no greater than approximately 5" overlying the center of said base, said throat element being held by said leg and arm in an elevated horizontal position above the base a distance similar to the diameter of said throat element, said throat element having a transverse size substantially smaller than that of the base so as to be disposed substantially within the upright projection of the said base;
   a used-oil receiving bag having an open end extending upwardly through and turned over said throat element; and
   clamping means for removably securing said bag open end about the wire portion forming said throat element to provide an unobstructed entrance for free ingress of oil into the bag, said upright leg being of a length substantially less than the length of said bag so that a major portion of the bag may rest upon the underlying surface upon which the stand is placed when said open end is so secured; as when positioned under an engine to receive oil draining therefrom, the bag being secured to the stand at said throat element only, the size of said bag being preselected to assure that the collected oil is supported substantially only by the underlying surface and stand base thereby to avoid placing stress on the wire stand sufficient to cause undesirable deformation thereof in oil-collecting use and whereby the open end of the bag is maintained fixed to said throat element in oil-receiving disposition spaced above the underlying surface while the bag is receiving the entire quantity of used oil from the automotive engine, said bag being formed of a strong, nonpermeable synthetic resin, such as polyethylene, adapted to have the open end gathered and tied to define a substantially leakproof, readily disposable bag of the collected used oil.

2. The structure of claim 1 wherein said base comprises an annular wire portion.

3. The structure of claim 1 wherein said base and throat element comprise annular wire portions, the throat having a diameter of approximately 4" to 5" and the base having a diameter at least twice that of the throat.

4. The structure of claim 1 wherein said securing means comprises a plurality of bendable flat metal strips clamped about the bag end and throat element at spaced intervals to removably hold the bag open end to the throat.

5. The structure of claim 1 wherein said bag rests on said base and extends forwardly therefrom in spaced relationship to said upright leg.

6. The structure of claim 1 further including manually operable paper-covered wire tie means for sealingly closing the bag for garbage can disposal of the bag and contained engine oil.

7. The structure of claim 1 wherein said upright leg has a length substantially less than the diameter of said base.

* * * * *